(12) United States Patent
Thomas

(10) Patent No.: US 7,602,298 B2
(45) Date of Patent: Oct. 13, 2009

(54) SECURITY ZONES FOR CASINO GAMING

(75) Inventor: Alfred Thomas, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

(21) Appl. No.: 11/956,466

(22) Filed: Dec. 14, 2007

(65) Prior Publication Data

US 2008/0096649 A1 Apr. 24, 2008

Related U.S. Application Data

(63) Continuation of application No. 11/065,179, filed on Feb. 24, 2005, now Pat. No. 7,330,108.

(51) Int. Cl.
*G08B 13/14* (2006.01)
(52) U.S. Cl. ............ 340/572.1; 340/505; 235/385
(58) Field of Classification Search ........... 340/572.1, 340/505, 825.49, 568.1, 571, 572.4, 572.7, 340/10.1, 10.4; 235/385, 375, 487, 382, 235/384, 381
See application file for complete search history.

(56) References Cited

U.S. PATENT DOCUMENTS

| | | | |
|---|---|---|---|
| 4,363,029 A | 12/1982 | Piliavin et al. |
| 4,733,222 A | 3/1988 | Evans |
| 4,758,830 A | 7/1988 | Levien et al. |
| 4,814,760 A | 3/1989 | Johnston et al. |
| 4,910,504 A | 3/1990 | Eriksson |
| 5,028,875 A | 7/1991 | Peters |
| 5,043,710 A | 8/1991 | Rydel |
| 5,063,306 A | 11/1991 | Edwards |
| 5,112,060 A | 5/1992 | Jones |
| 5,166,502 A | 11/1992 | Rendleman et al. |
| 5,189,417 A | 2/1993 | Caldwell et al. |
| 5,239,152 A | 8/1993 | Caldwell et al. |
| 5,305,017 A | 4/1994 | Gerpheide |
| 5,349,303 A | 9/1994 | Gerpheide |
| 5,389,219 A | 2/1995 | Zwack |
| 5,442,347 A | 8/1995 | Vranish |
| 5,461,319 A | 10/1995 | Peters |

(Continued)

FOREIGN PATENT DOCUMENTS

EP 1431942 A2 6/2004

(Continued)

OTHER PUBLICATIONS

"U.S. Appl. No. 11/065,179, Non-Final Office Action mailed May 1, 2007", 6 pgs.

(Continued)

*Primary Examiner*—Toan N Pham
(74) *Attorney, Agent, or Firm*—Schwegman, Lundberg & Woessner, P.A.

(57) ABSTRACT

Systems and methods are described for monitoring a location of a casino game for use in a gaming establishment wherein at least some of the components of the game include an attached radio frequency-responsive element, such as an RFID tag. In one example, RFID readers are located in stationary positions in gaming establishment to monitor a population of secure zones.

17 Claims, 6 Drawing Sheets

U.S. PATENT DOCUMENTS

| | | |
|---|---|---|
| 5,495,077 A | 2/1996 | Miller et al. |
| 5,512,836 A | 4/1996 | Chen et al. |
| 5,565,658 A | 10/1996 | Gerpheide et al. |
| 5,572,205 A | 11/1996 | Caldwell et al. |
| 5,594,222 A | 1/1997 | Caldwell |
| 5,650,597 A | 7/1997 | Redmayne |
| 5,651,548 A | 7/1997 | French et al. |
| 5,735,742 A | 4/1998 | French |
| 5,760,715 A | 6/1998 | Senk et al. |
| 5,761,647 A | 6/1998 | Boushy |
| 5,790,106 A | 8/1998 | Hirano et al. |
| 5,861,875 A | 1/1999 | Gerpheide |
| 5,867,111 A | 2/1999 | Caldwell et al. |
| 5,880,718 A | 3/1999 | Frindle et al. |
| 5,901,211 A | 5/1999 | Dean et al. |
| 5,973,318 A | 10/1999 | Plesko |
| 5,978,770 A | 11/1999 | Waytena et al. |
| 5,987,421 A | 11/1999 | Chuang |
| 6,002,344 A | 12/1999 | Bandy et al. |
| 6,021,949 A | 2/2000 | Boiron |
| 6,104,815 A | 8/2000 | Alcorn et al. |
| 6,137,427 A | 10/2000 | Binstead |
| 6,222,528 B1 | 4/2001 | Gerpheide et al. |
| 6,232,870 B1 | 5/2001 | Garber et al. |
| 6,288,707 B1 | 9/2001 | Philipp |
| 6,297,811 B1 | 10/2001 | Kent et al. |
| 6,310,611 B1 | 10/2001 | Caldwell |
| 6,320,282 B1 | 11/2001 | Caldwell |
| 6,348,862 B1 | 2/2002 | McDonnell et al. |
| 6,373,263 B1 | 4/2002 | Netzer |
| 6,373,265 B1 | 4/2002 | Morimoto et al. |
| 6,388,453 B1 | 5/2002 | Greer |
| 6,407,556 B1 | 6/2002 | Rudeke |
| 6,490,920 B1 | 12/2002 | Netzer |
| 6,652,381 B1 | 11/2003 | Ungaro |
| 6,659,875 B2 | 12/2003 | Purton |
| 6,843,725 B2 * | 1/2005 | Nelson ............ 463/40 |
| 6,846,238 B2 | 1/2005 | Wells |
| 6,923,724 B2 | 8/2005 | Williams |
| 6,935,958 B2 * | 8/2005 | Nelson ............ 463/42 |
| 6,942,574 B1 | 9/2005 | LeMay et al. |
| 7,035,818 B1 | 4/2006 | Bandy et al. |
| 7,159,765 B2 | 1/2007 | Frerking |
| 7,217,190 B2 | 5/2007 | Weiss |
| 7,316,619 B2 * | 1/2008 | Nelson ............ 463/42 |
| 7,330,108 B2 * | 2/2008 | Thomas ............ 340/505 |
| 2002/0006829 A1 | 1/2002 | Purton |
| 2002/0111210 A1 | 8/2002 | Luciano et al. |
| 2003/0070414 A1 | 4/2003 | Pohn et al. |
| 2004/0087375 A1 | 5/2004 | Gelinotte |
| 2004/0138918 A1 | 7/2004 | Fujimoto |
| 2004/0192438 A1 | 9/2004 | Wells et al. |
| 2004/0219982 A1 | 11/2004 | Khoo et al. |
| 2005/0009600 A1 | 1/2005 | Rowe et al. |
| 2005/0012818 A1 | 1/2005 | Kiely et al. |
| 2005/0043072 A1 | 2/2005 | Nelson |
| 2005/0116020 A1 | 6/2005 | Smolucha et al. |
| 2005/0181870 A1 | 8/2005 | Nguyen et al. |
| 2005/0288085 A1 | 12/2005 | Schubert et al. |
| 2006/0063586 A1 | 3/2006 | Krenn et al. |
| 2006/0094498 A1 | 5/2006 | Jorasch et al. |
| 2006/0095790 A1 | 5/2006 | Nguyen et al. |
| 2006/0180647 A1 | 8/2006 | Hansen |
| 2006/0258442 A1 | 11/2006 | Ryan |
| 2006/0287078 A1 | 12/2006 | Smolucha et al. |
| 2007/0105616 A1 | 5/2007 | Chapet et al. |

FOREIGN PATENT DOCUMENTS

| | | |
|---|---|---|
| WO | WO-9636253 A1 | 11/1996 |
| WO | WO-0231739 A1 | 4/2002 |
| WO | WO-03049048 A1 | 6/2003 |
| WO | WO-03088163 A1 | 10/2003 |
| WO | WO-2004102731 A2 | 11/2004 |
| WO | WO-2005105235 A1 | 11/2005 |
| WO | WO-2006037220 A1 | 4/2006 |
| WO | WO-2007054626 A1 | 5/2007 |

OTHER PUBLICATIONS

"U.S. Appl. No. 11/065,179, Response filed Aug. 1, 2007 to Non-Final Office Action mailed May 1, 2007.", 7 pgs.

"Notice of Allowance mailed Sep. 13, 2007 in U.S. Appl. No. 11/065,179", NOAR,6 pgs.

Scheeres, Julia , "Three R's: Reading, Writing, RFID", *Wired News*, http://www.wired.com/news/technology/0,12825/24/0,60898,00. html, (Archived Nov. 27, 2003),4 Pages.

"U.S. Appl. No. 10/703,394 Non-Final Office Action mailed Apr. 1, 2008", 31 pgs.

"U.S. Appl. No. 10/703,394 Response filed Apr. 1, 2008 to Non Final Office Action mailed Oct. 1, 2008", 11 pgs.

"U.S. Appl. No. 11/065,179 312 Amendment filed Dec. 5, 2007", 10 pgs.

"U.S. Appl. No. 11/065,179 PTO Response to Rule 312 Communication mailed Dec. 26, 2007", 2 pgs.

"U.S. Appl. No. 11/382,867 Response filed Sep. 8, 2008 to Non Final Office Action mailed Apr. 7, 2008", 9 pgs.

"U.S. Appl. No. 11/382,867 Final Office Action mailed Nov. 13, 2008", 12 pgs.

"U.S. Appl. No. 11/382,867 Non-Final Office Action mailed Apr. 7, 2008", 9 pgs.

"U.S. Appl. No. 11/419,870 Response filed Jul. 14, 2008 to Non Final Office Action mailed Apr. 14, 2008", 10 pgs.

"U.S. Appl. No. 11/419,870 Non Final Office Action Mailed on Jan. 28, 2009", 10 pgs.

"U.S. Appl. No. 11/419,870 Non-Final Office Action mailed Apr. 14, 2008", 14 pgs.

"U.S. Appl. No. 10/703,394 Final Office Action mailed Feb. 11, 2009", 15 pgs.

* cited by examiner

US 7,602,298 B2

SECURITY ZONES FOR CASINO GAMING

RELATED APPLICATIONS

This application is a Continuation of U.S. patent application Ser. No. 11/065,179, filed Feb. 24, 2005, now U.S. Pat. No. 7,330,108 which is incorporated herein by reference in its entirety.

TECHNICAL FIELD OF THE INVENTION

The invention pertains generally to casino gaming apparatus, or casino games; and more particularly to articles, apparatus and methods for tracking casino games suitable for use in a gaming establishment.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND OF THE INVENTION

The security and reliability of gaming devices is of foremost importance to gaming regulators and to game manufacturers. As such, it is important that the components of gaming machines and devices be maintained in working order and also that the proper components are indeed used in any particular game. Further, it is important to detect fraudulent schemes intended to compromise the security of a gaming machine by relocating the gaming machine into an unsecured area.

DESCRIPTION

In the following detailed description of the embodiments of the inventive subject matter disclosed herein, reference is made to the accompanying drawings that form a part hereof, and in which is shown by way of illustration specific embodiments in which the inventive subject matter disclosed herein may be practiced. These embodiments are described in sufficient detail to enable those skilled in the art to practice the inventive subject matter disclosed herein, and it is to be understood that other embodiments may be utilized and that changes may be made without departing from the scope of the present inventive subject matter. The following detailed description is, therefore, not to be taken in a limiting sense, and the scope of the present inventive subject matter is defined only by the appended claims.

As used herein, the term 'casino game' encompasses, without limitation, slot machines, video poker machines, roulette tables, poker tables, craps tables and any other wagering game offered by a gaming establishment wherein for example the game qualifies as regulated and/or licensed gaming equipment. In addition to more traditional stationary casino games wireless portable gaming devices are also encompassed in the term casino game. The term 'gaming establishment' refers to an establishment that offers casino gaming experiences to its patrons and, in one example embodiment, is licensed by a gaming regulatory authority to provide such gaming experiences.

Figure 1A:
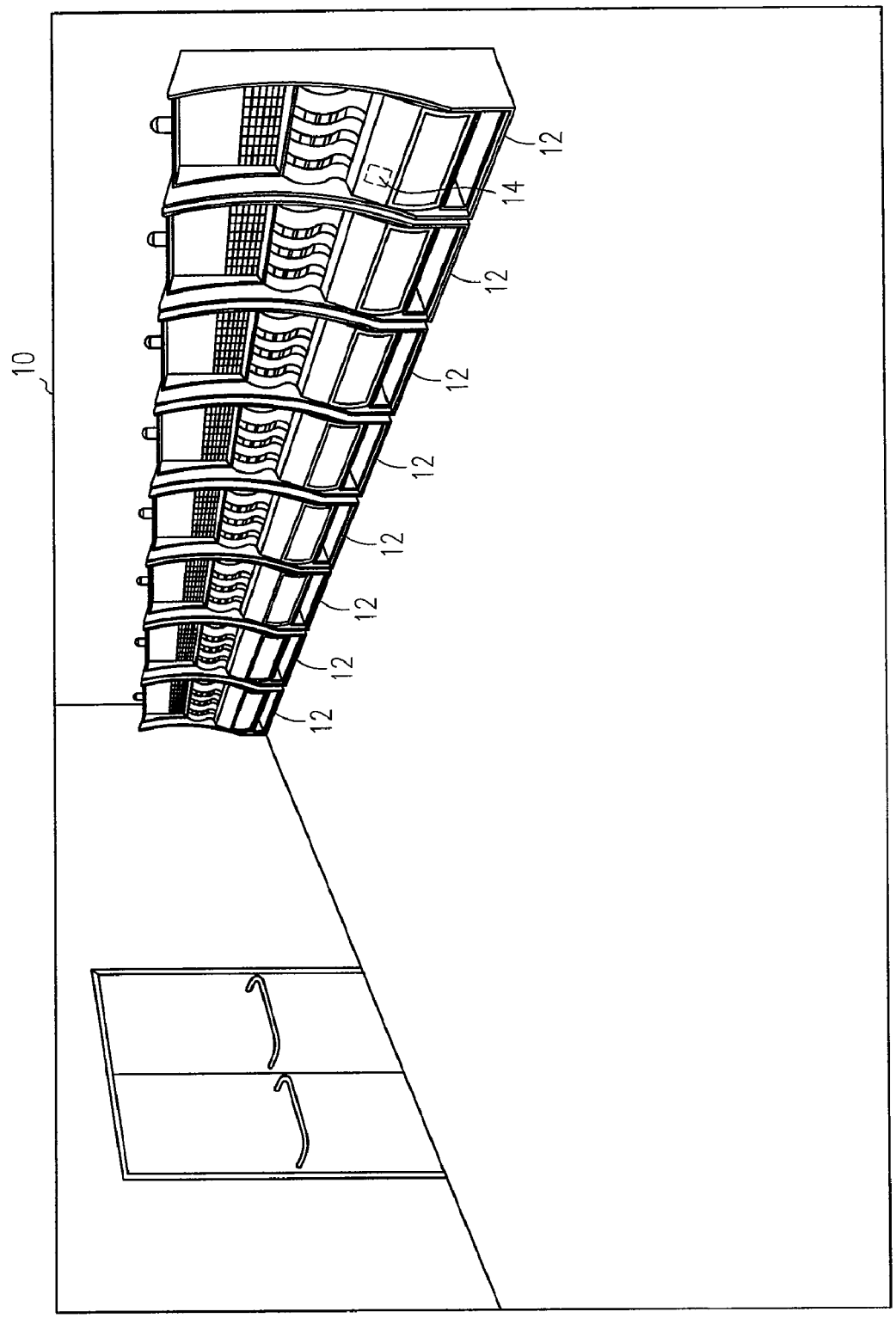
FIG. 1A illustrates a gaming establishment according to an embodiment of the invention.
Figure 1B:
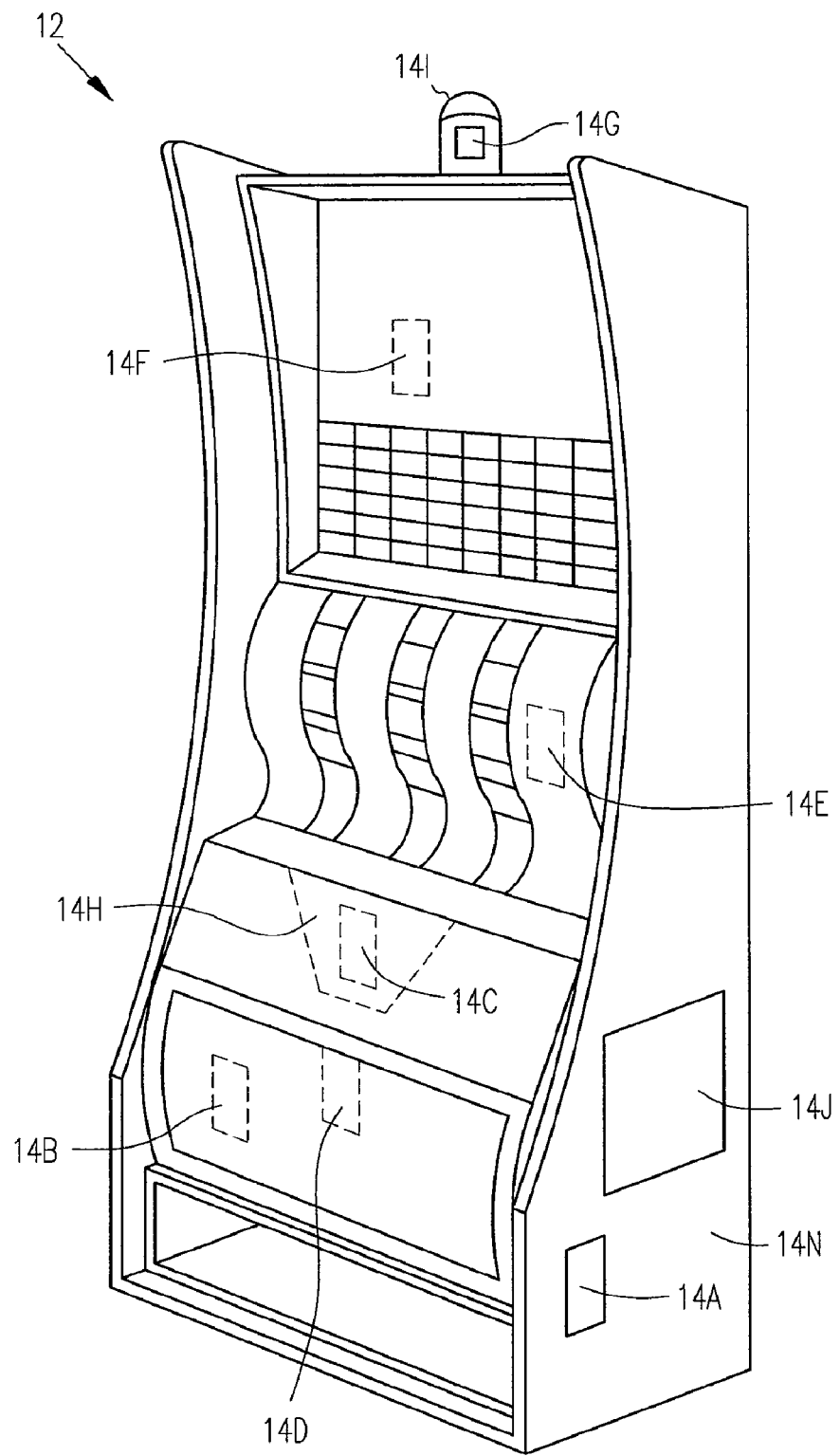
FIG. 1B illustrates a gaming machine and components according to an embodiment of the invention.

FIGS. 1A and 1B illustrate one example embodiment of the inventive subject matter disclosed herein, located at an example gaming establishment 10. The gaming establishment 10 includes at least one but often a plurality of casino games 12. Each casino game 12 in the example includes a plurality of subcomponents, and one or more of the subcomponents includes an attached radio frequency-responsive element 14a, 14b, ..., 14n.

Radio frequency identification, or RFID, is a term for technologies that use radio waves and radio frequency-responsive elements to automatically identify individual items. One of the most common methods of identifying individual items is to store a serial number that identifies a component, and perhaps other information, on a radio frequency-responsive element. One example of a radio frequency-responsive element is a microchip that is attached to an antenna, described in more detail below with respect to FIG. 2. The chip and the antenna together are often called an RFID transponder or an RFID tag. The antenna enables the chip to transmit the identification information to a reader. A reader converts the radio waves returned from the radio frequency-responsive element into a form that can then be passed on to, for example, a software system that can make use of it.

Radio frequency-responsive elements can be either active or passive. An active tag incorporates an additional energy source, such as a battery, into the tag construction. This energy source permits active radio frequency-responsive elements to create and transmit strong response signals even in regions where the interrogating radio frequency field is weak, and thus an active radio frequency-responsive element can be detected at greater range. However, the relatively short lifetime of the battery limits the useful life of the tag. In addition, the battery adds to the size and cost of the tag. A passive element derives the energy needed to power the element from the interrogating radio frequency field, and uses that energy to transmit response codes by modulating the impedance the antenna presents to the interrogating field, thereby modulating the signal reflected back to the reader antenna. Because passive elements are preferred for many applications, the remainder of the discussion will be confined to this class of element. Those skilled in the art, however, will recognize that these two types of elements share many features and that both can be used in the examples of this disclosure.

FIG. 1B shows a casino game 12 including a plurality of radio frequency-responsive elements 14a-14n that are associated with respective subcomponents of the casino game 12. By way of illustration, components of the casino games 12 can include items such as the housing, monitors, printers, hoppers, money validation devices, cabinets, secondary displays, dot matrix devices, signage, chairs, power supplies, lights, electronic boards, or other components such as Flash memory, read-only memory (ROM) or programmable read only memory devices (PROM) devices or other data storage devices, or processing units. The ROM, PROM or other memory storage devices may store critical and sensitive software or data used to control machine operation, calculate odds, determine payouts or other sensitive computations or controls. Those skilled in the art can recognize that this list is not inclusive or applicable to each casino game covered by the inventive subject matter disclosed herein. In one example, the elements are attached to the subcomponents with a pressure sensitive adhesive (PSA). An example of information stored in each element and transmitted to a reader interrogating the element can include an identification of the attached component.

Possible fraudulent schemes to compromise the security of a gaming machine may include relocating the gaming machine into an unsecured area within a gaming establishment (or even removing from the gaming establishment premises). Embodiments of the invention provide a secured zone in which casino games, and casino game components, are confined using a radio frequency-responsive element. The radio frequency-responsive elements can be placed on specific gaming machine components as explained above.

The perimeter, and/or area, of the secure zone are monitored by readers for the presence of the gaming machine frequency-responsive elements. If a frequency-responsive element corresponding to a gaming machine is removed from the secure zone a security alert is issued. Thus, perimeter or area readers monitor the presence of the gaming machine components and report their presence to a central server that stores the status of each component's RFID.

In another embodiment, the readers can also detect the frequency-responsive element signatures of gaming machines and components that are not supposed to be in the secure zone. As such, sufficient frequency-responsive element sensors can be placed on the casino floor to track the movement of gaming machines and components within secure zones of the casino. Embodiments of the invention may be particularly applicable to monitoring locations of wireless gaming machines that may be moved to unsecured locations and continue to function without any apparent anomalous behavioral characteristics. While located in an unsecured area the machine may be tampered with in an effort to gain entry into the casino network.

Additional security can be obtained by making the RFID tag tamper-evident, tamper-resistant, or tamper-proof. One way of providing such additional security is to use high strength adhesive to attach the RFID tag to the subcomponents of the machine, for example by adhering the antenna of the radio frequency-responsive element to the component such that removal of the RFID tag would destroy or disable the antenna. In another example, the RFID tag may be permanently, semi-permanently or removably attached to the component using tamper-resistant, tamper-evident or tamper proof fastening, or by other means. Such fastening may include riveting or molding the RFID tag to the subcomponents of the machine. In cases where the RFID tags are readily visible to an observer, additional security measures can include other coded or uncoded visual information on the RFID tag.

Figure 2:
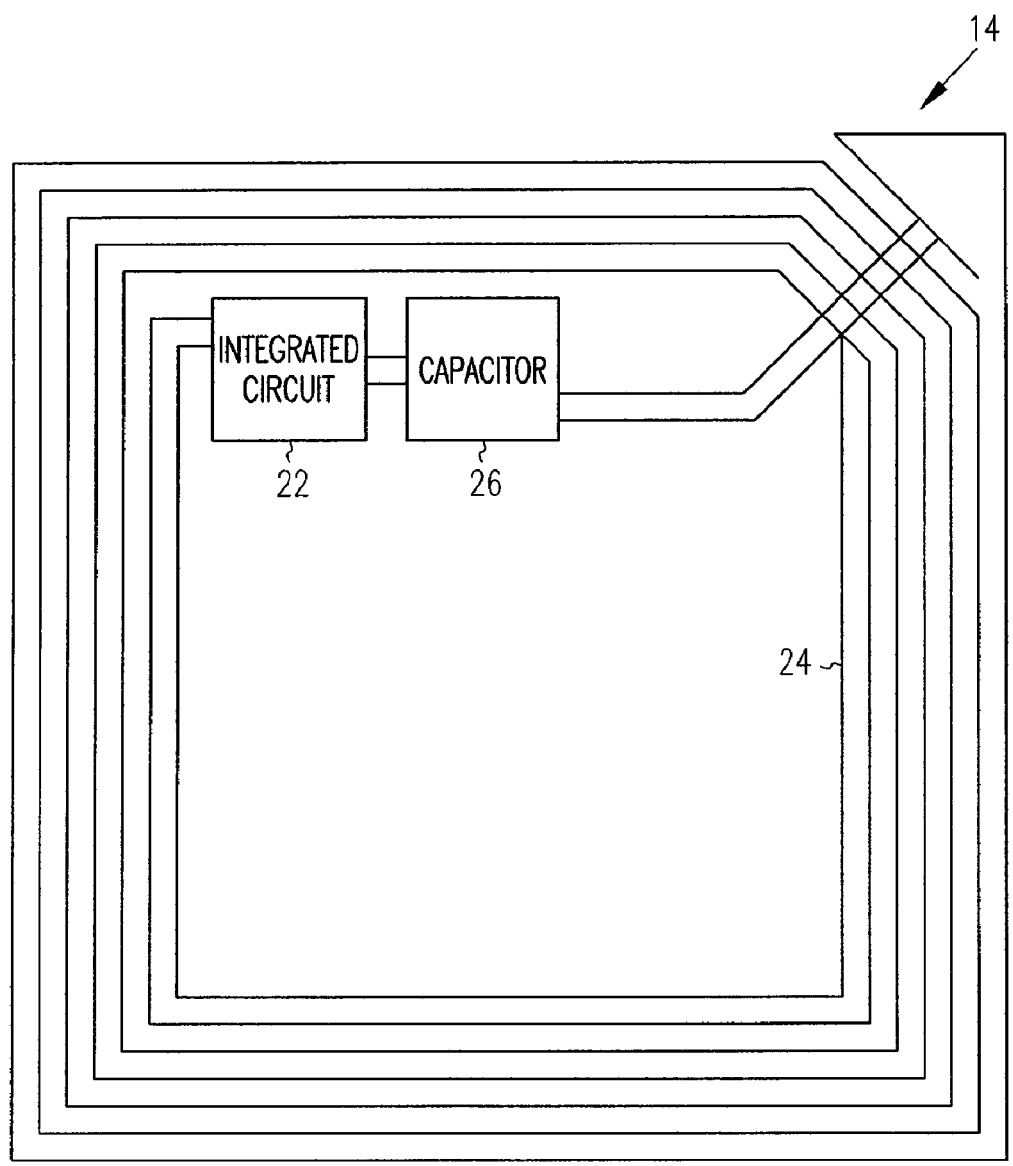
FIG. 2 illustrates a radio frequency-responsive element according to an embodiment of the invention.

As shown in FIG. 2, a passive radio frequency-responsive element 14 typically includes two components: an integrated circuit 22 and an antenna 24. A capacitor 26 can also be included in element 14. The integrated circuit provides the primary identification function. It includes software and circuitry to permanently store the tag identification and other desirable information, interpret and process commands received from the interrogation hardware, respond to requests for information by the interrogator, and assist the hardware in resolving conflicts resulting from multiple tags responding to interrogation simultaneously. Optionally, the integrated circuit may provide for updating the information stored in its memory (read/write) as opposed to just reading the information out (read only). Integrated circuits suitable for use in radio frequency-responsive elements include, but are not limited to, those available from Texas Instruments (in their TIRIS line of products), Philips (in their Mifare and Hitag line of products), Motorola/Indala, and Single Chip Systems, among others. One example is a tag from Texas Instruments sold under the trade designation #RI-I01-110A.

The antenna geometry and properties depend on the desired operating frequency of the radio frequency-responsive portion of the tag. For example, 2.45 GHz (or similar) radio frequency-responsive elements would typically include a dipole antenna, such as the linear dipole antennas (not shown), or folded dipole antennas (not shown). A 13.56 MHz (or similar) radio frequency-responsive element would use a spiral or coil antenna 24. In either case, the antenna 24 intercepts the radio frequency energy radiated by an interrogation source. This signal energy carries both power and commands to the tag. The antenna enables the radio frequency-responsive element to absorb energy sufficient to power the IC chip and thereby provide the response to be detected.

Figure 3:
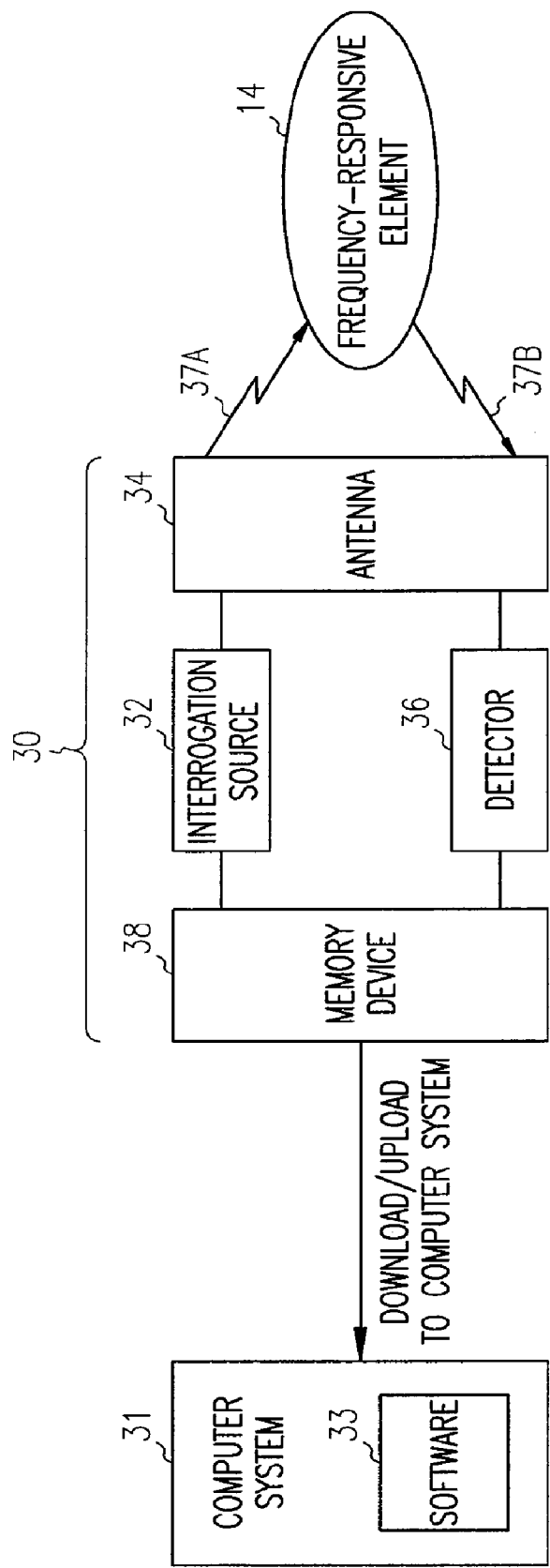
FIG. 3 illustrates various system embodiments of the disclosed inventive subject matter.

In operation, as shown in FIG. 3, the radio frequency-responsive element 14 is interrogated by reader 30, which is typically located near the point at which the tags are to be monitored. In embodiments of the invention, reader(s) are located in a casino to define discreet secure zones. For example, multiple readers can be used to establish a secure perimeter. Alternatively, one or more readers can be located to create a monitored secure area taking into account physical characteristics, such as walls and doors.

An interrogation source 32 (typically including a drive oscillator and an amplifier) is coupled to an antenna 34 (sometimes described as a field coil) for transmitting an alternating radio frequency field, or interrogation signal, in the interrogation zone. The system 30 also includes an antenna for receiving a signal (shown as antenna 34, and sometimes described as a receiving coil) and detector 36 for processing signals produced by tags in the interrogation zone.

The interrogation source 32 transmits an interrogation signal 37a, which may be selected within certain known frequency bands that are preferred because they do not interfere with other applications, and because they comply with applicable government regulations. When the radio frequency-responsive element receives an interrogation signal it transmits its own response code signal 37b that is received by the antenna 34 and transmitted to detector 36. The detector decodes the response, identifies the tag (typically based on information stored in a computer and/or other memory device 38), and takes action based on the code signal detected. Various modifications of the illustrated system are known to those of skill in the art including, for example, using separate antennas for the interrogation source 32 and the detector 36 in place of the single antenna 34 that is illustrated.

A computer system 31 is further provided in one example embodiment in order to store and analyze secure zone populations. System 31 may be located proximate the gaming machines 12, or may be located remotely from the machines, or may be portable, for example carried by maintenance or security worker. System 31, in one embodiment, may store an expected population, or inventory, for one or more secure zones. Such inventory may be input in the system 31 manually, or may be input automatically for example by scanning a machine after it has been assembled and automatically gathering the inventory information from the results of the scan. System 31, in one embodiment, includes software 33 capable of assembling and maintaining the inventory, retrieving inventory data and modifying inventory data representing the subcomponents of a machine. In one embodiment, system 31 is a server that is accessible to personnel responsible for assembling and shipping machines 12. System 31 may also be accessible to maintenance or security personnel working in a casino environment in which the machines 12 are positioned. Such a server may be an Internet-based server, for example a web server, or any other type of server or method for wide area network access, for example using wireless communications. System 31 may issue security alarms or notifications when a security zone actual population (inventory) differs from the expected population for that security zone.

Figure 4:
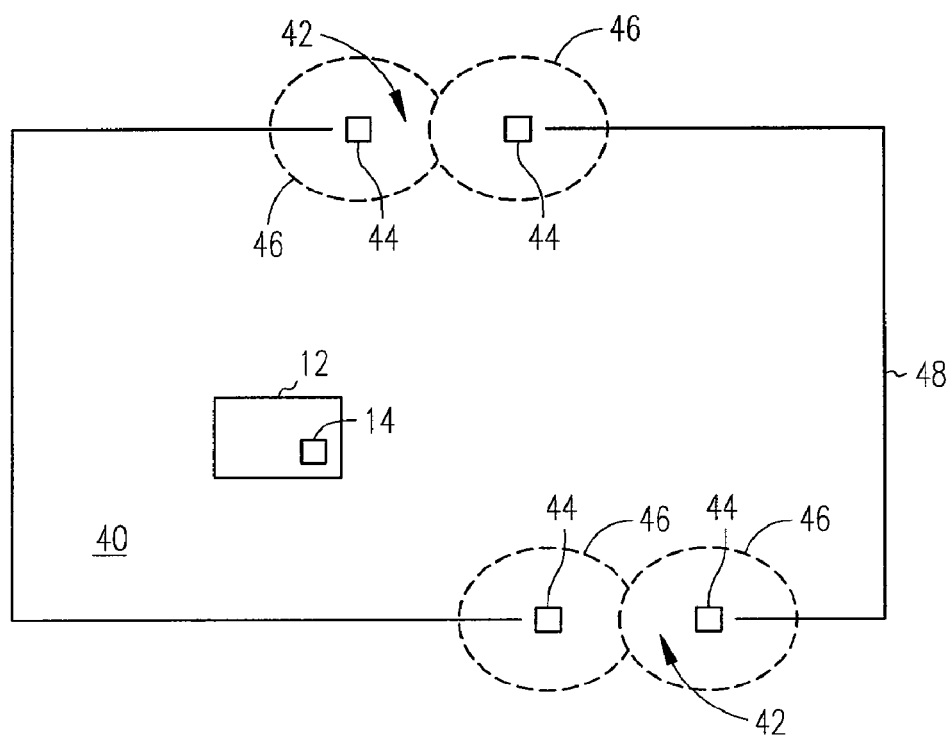
FIG. 4 illustrates a perimeter secure zone embodiment of the disclosed inventive subject matter.

FIG. 4 illustrates an embodiment where placement of readers 44 establishes a secure zone perimeter 48 in a gaming establishment 40. As such, multiple readers are located at stationary positions at entrance or exit locations 42 of the desired zone. As RFID tags 14, illustrated as a component of game 12, are transported through the perimeter the location of the gaming devices are tracked relative to their assigned zone. This embodiment allows for a larger secured zone, but may leave areas within the secured zone un-monitored.

Figure 5:
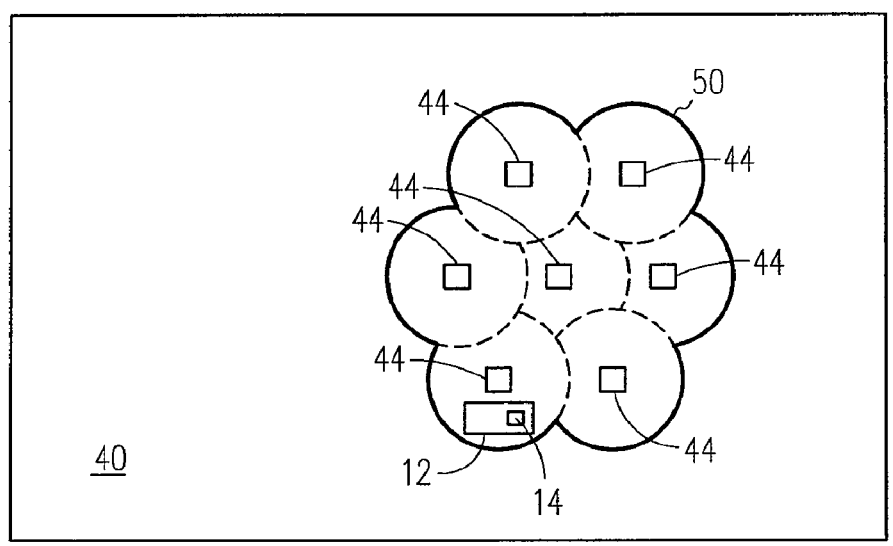
FIG. 5 illustrates an area secure zone embodiment of the disclosed inventive subject matter.

FIG. 5 illustrates an embodiment where stationary placement of readers 44 establishes a secure zone 50. Each reader has a transmit and receive radius that allows for monitoring elements 14 located in an area proximate to the reader. Thus, the predetermined stationary positions of the readers in a gaming establishment 40 result in a fully monitored secure zone created by the overlapping radiuses of the receiver. As illustrated in FIG. 5, multiple readers positioned in groups within the gaming establishment define a secure zone (solid line) 50 defined by the individual reading boundaries of the readers. It will be appreciated that a single reader can define a security zone.

Figure 6:
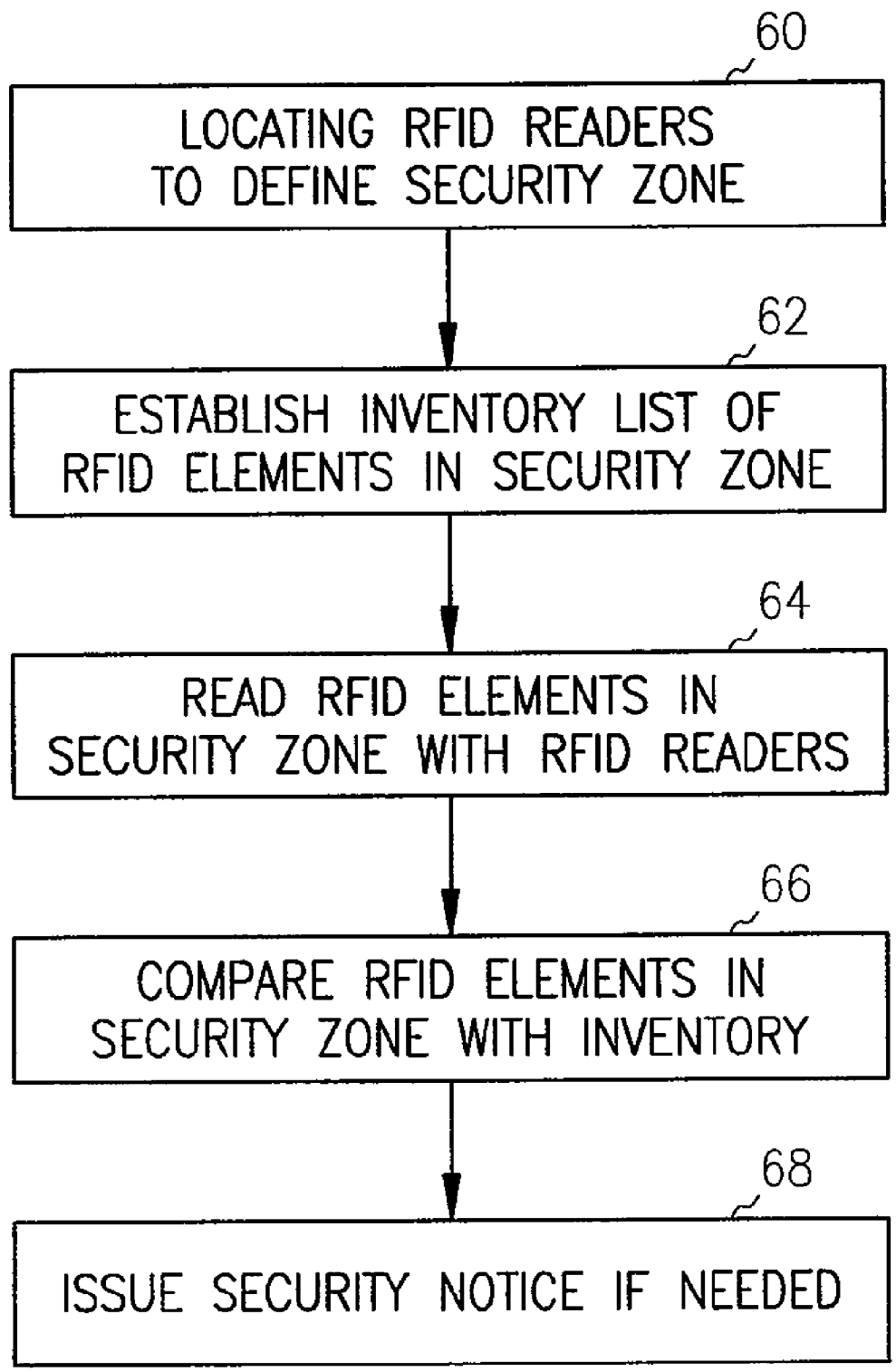
FIG. 6 is a flow chart illustrating a method of one embodiment.

FIG. 6 illustrates a method according to one embodiment. The method includes locating a radio frequency identification reader at a stationary location(s) within a gaming establishment to define a secure zone 60. An inventory list of radio frequency-responsive elements expected to be located within the secure zone is established 62. This inventory list can be established manually, automatically by reading RFID tags or a combination of both. The radio frequency-responsive elements physically located within the secure zone are read 64 and the read radio frequency-responsive elements physically located within the secure zone are compared with the inventory list 66. If necessary a security notice is issued based upon the comparison 68.

What is claimed is:

1. A method comprising:
positioning a plurality of radio frequency identification readers with overlapping operational radiuses at locations associated with a gaming establishment to define a secure zone, the secure zone defined by the outer perimeter created by the operational radiuses;
interrogating a radio frequency-responsive element associated with a component of a casino gaming terminal using a radio frequency identification reader of the plurality radio frequency identification readers;
receiving a signal from the interrogated radio frequency-responsive element with the radio frequency identification reader; and
recording location information about the component based on the received signal relative to the secure zone of the gaming establishment.

2. The method of claim 1 further comprising:
creating expected population data for the secure zone;
comparing the location information from the received signal to the expected population data; and
generating results of the comparison.

3. The method of claim 2 further comprising issuing a security notification when the location information deviates from the expected population data.

4. The method of claim 1 wherein the radio frequency-responsive element is a passive element.

5. A method comprising:
positioning a plurality of radio frequency identification readers with overlapping operational radiuses at locations associated with a gaming establishment, each operational radius defining an operational area in a plurality of operational areas;
defining a secure zone using the perimeter of an aggregate of the plurality of operational areas;
reading a radio frequency-responsive element physically located within the secure zone using at least one of the plurality of radio frequency identification readers;
comparing the read radio frequency-responsive element physically located within the secure zone with an inventory list of radio frequency-responsive elements expected to be located within the secure zone; and
issuing a security notice based upon the comparison.

6. The method of claim 5 further comprising establishing the inventory list of radio frequency-responsive elements expected to be located within the secure zone.

7. The method of claim 5 wherein the secure zone is located proximate to an exit location of the gaming establishment to secure a perimeter of the gaming establishment.

8. The method of claim 5 wherein the radio frequency-responsive element includes an antenna and an integrated circuit, the radio frequency-responsive element having information storage and transmission capabilities adapted to enable an interrogation system to obtain information from the radio frequency-responsive element.

9. The method of claim 8 wherein the information stored in the radio frequency-responsive element is related to identification of a component of a casino game.

10. The method of claim 8 wherein at least a portion of the radio frequency-responsive element is physically attached to the component.

11. The method of claim 5 wherein the radio frequency-responsive element is a passive element.

12. A method comprising:
interrogating a radio frequency-responsive element associated with a component of a casino gaming terminal using a radio frequency identification reader, the radio frequency identification reader selected from a plurality of radio frequency identification readers positioned with overlapping operational radiuses within a gaming establishment to define a secure zone, the secure zone defined by the outer perimeter created by the operational radiuses;
receiving a signal from the interrogated radio frequency-responsive element with the radio frequency identification reader; and
recording location information about the component based on the received signal relative to the secure zone of the gaming establishment.

13. The method of claim 12 further comprising:
comparing the location information from the received signal to an expected population data for the secure zone; and
issuing a security notification when the location information deviates from the expected population data.

14. A method comprising:
reading a radio frequency-responsive element physically located within the secure zone using at least one of a plurality of radio frequency identification readers, the plurality of radio frequency identification readers being positioned with overlapping operational radiuses within a gaming establishment, each operational radius defining an operational area in a plurality of operational areas;
defining a secure zone using the perimeter of an aggregate of the plurality of operational areas;
comparing the read radio frequency-responsive element with an inventory list of radio frequency-responsive elements expected to be located within the secure zone; and
issuing a security notice based upon the comparison.

15. The method of claim 14 further comprising:
establishing the inventory list of radio frequency-responsive elements expected to be located within the secure zone; and
storing the inventory list.

16. The method of claim 14 wherein the storing the inventory list comprises storing the inventory list in at least one of the plurality of radio frequency identification readers.

17. The method of claim 14 wherein the storing the inventory list comprises storing the inventory list at a server computer.

\* \* \* \* \*